(12) United States Patent
Persely

(10) Patent No.: US 9,633,481 B2
(45) Date of Patent: Apr. 25, 2017

(54) SYSTEM FOR INSPECTING OBJECTS USING AUGMENTED REALITY

(71) Applicant: FARO Technologies, Inc., Lake Mary, FL (US)

(72) Inventor: Robert M. Persely, Orlando, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 15/081,032

(22) Filed: Mar. 25, 2016

(65) Prior Publication Data

US 2016/0284079 A1 Sep. 29, 2016

Related U.S. Application Data

(60) Provisional application No. 62/138,433, filed on Mar. 26, 2015.

(51) Int. Cl.
*G06T 19/00* (2011.01)
*G01B 21/00* (2006.01)
*G01B 11/00* (2006.01)

(52) U.S. Cl.
CPC ............ *G06T 19/006* (2013.01); *G01B 11/00* (2013.01); *G01B 21/00* (2013.01)

(58) Field of Classification Search
USPC ........................................................ 382/151
See application file for complete search history.

(56) References Cited

U.S. PATENT DOCUMENTS

| 2012/0127279 | A1* | 5/2012 | Kochi | G01B 11/24 348/50 |
| 2015/0306824 | A1* | 10/2015 | Flores Mangas | B29C 67/0088 700/98 |
| 2016/0163067 | A1* | 6/2016 | Williams | G01B 11/00 382/154 |
| 2017/0014049 | A1* | 1/2017 | Dumanyan | A61B 5/112 |

* cited by examiner

*Primary Examiner* — Jerome Grant, II
(74) *Attorney, Agent, or Firm* — Cantor Colburn LLP

(57) ABSTRACT

A method of comparing measured three-dimensional (3D) measurement data to an object is provided. The method includes the steps of providing a three dimensional measurement device configured to measure 3D coordinates of points on the object and a computing device having a camera and display. During an inspection process, the method measures the object with the 3D measurement device which provides a first collection of 3D coordinates. The first collection of 3D coordinates is stored on the computer network and is associated with an AR marker. During an observation process the method reads the AR marker and transmits from the computer network the first collection of 3D coordinates and a dimensional representation of the object to the computing device. A portion of the first collection of 3D coordinates is registered to the camera image. On the integrated display the registered collection of 3D coordinates and the camera image are shown.

20 Claims, 5 Drawing Sheets

SYSTEM FOR INSPECTING OBJECTS USING AUGMENTED REALITY

CROSS-REFERENCE TO RELATED APPLICATIONS

The present application is a nonprovisional patent application of Provisional Application Ser. No. 62/138,433 filed on Mar. 26, 2015, the contents of which are incorporated herein by reference.

BACKGROUND OF THE INVENTION

The subject matter disclosed herein relates to the dimensional inspection of objects using three-dimensional (3D) coordinate measurement devices, and more particularly to a system that allows the retrieval of inspection data using augmented reality.

Augmented reality (AR) refers to a direct or indirect view of the physical, real-world environment whose elements are augmented based on computer-generated sensory input (e.g., accelerometer or GPS data). In this manner, AR enhances one's current perception of relation. By contrast, virtual reality replaces the real world with a simulated one.

AR is generally performed as an application being executed on a portable device to display information in context with environmental elements. For example, an AR application running on a portable device may be used in a golf context to show distances to a fairway or green. Further, an AR application running on a portable device may be used in an outdoor context to show compass parameters, position information, or points of interest relative to the physical environment in which one resides. Further, an AR application running on a portable device may be used in a gaming context, in which objects in the physical environment in which one resides becomes part of a game experience. With AR, computer-generated graphics (e.g., words and/or lines) are often overlaid onto the real-world view provided by a camera view of a portable device.

While existing systems were suitable for their intended purposes, the need for improvement remains, particularly in providing a system that improves access to inspection data and facilitates operator interaction with the inspection data using augmented reality.

BRIEF DESCRIPTION OF THE INVENTION

According to one aspect of the invention, a method of comparing measured three-dimensional (3D) measurement data to an object is provided. The method includes the steps of providing a 3D measurement device configured to measure 3D coordinates of points on the object; providing a computing device having an integrated camera and an integrated display; providing an AR-marker reader; providing a computer network; and providing a dimensional representation of the object and storing the dimensional representation of the object on the computer network. During an inspection process, the method performs steps of: measuring the object with the 3D measurement device, the 3D measurement device providing a first collection of 3D coordinates; storing the first collection of 3D coordinates on the computer network; associating an AR marker with the object. During an observation process occurring at a time later than the inspection process, the method performs the steps of: reading the AR marker with the AR-marker reader; transmitting from the computer network the first collection of 3D coordinates and the dimensional representation of the object; determining an object identification based at least in part on the AR marker; positioning the integrated camera to view the object and to generate a camera image of the viewed object; displaying the camera image on the integrated display; registering a portion of the first collection of 3D coordinates to the camera image to obtain a registered collection of 3D coordinates, the registration based at least in part on comparison of the camera image and one of the first collection of 3D coordinates and the dimensional representation of the object on the computer network; and showing on the integrated display the registered collection of 3D coordinates and the camera image.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the invention provide advantages in allowing an operator to review the results of an inspection performed on an object. Embodiments of the invention provide advantages in allowing the operator to review the inspection results by superimposing the inspection results on a real-time image of the object. Still further embodiments of the invention provide advantages in allowing the operator to review the inspection results by superimposing the inspection results on a virtual image of the object where the virtual image of the object is displayed on a real-time image of the environment.

Embodiments of the invention provide further advantages in storing the inspection results in a network server. The inspection results may be quickly retrieved using a machine readable code or marker that is automatically generated and associated with the inspected object and the measured dimensional data. Embodiments of the invention provide still further advantages in allowing the inspection results to be reviewed on a variety of devices.

Figure 1:
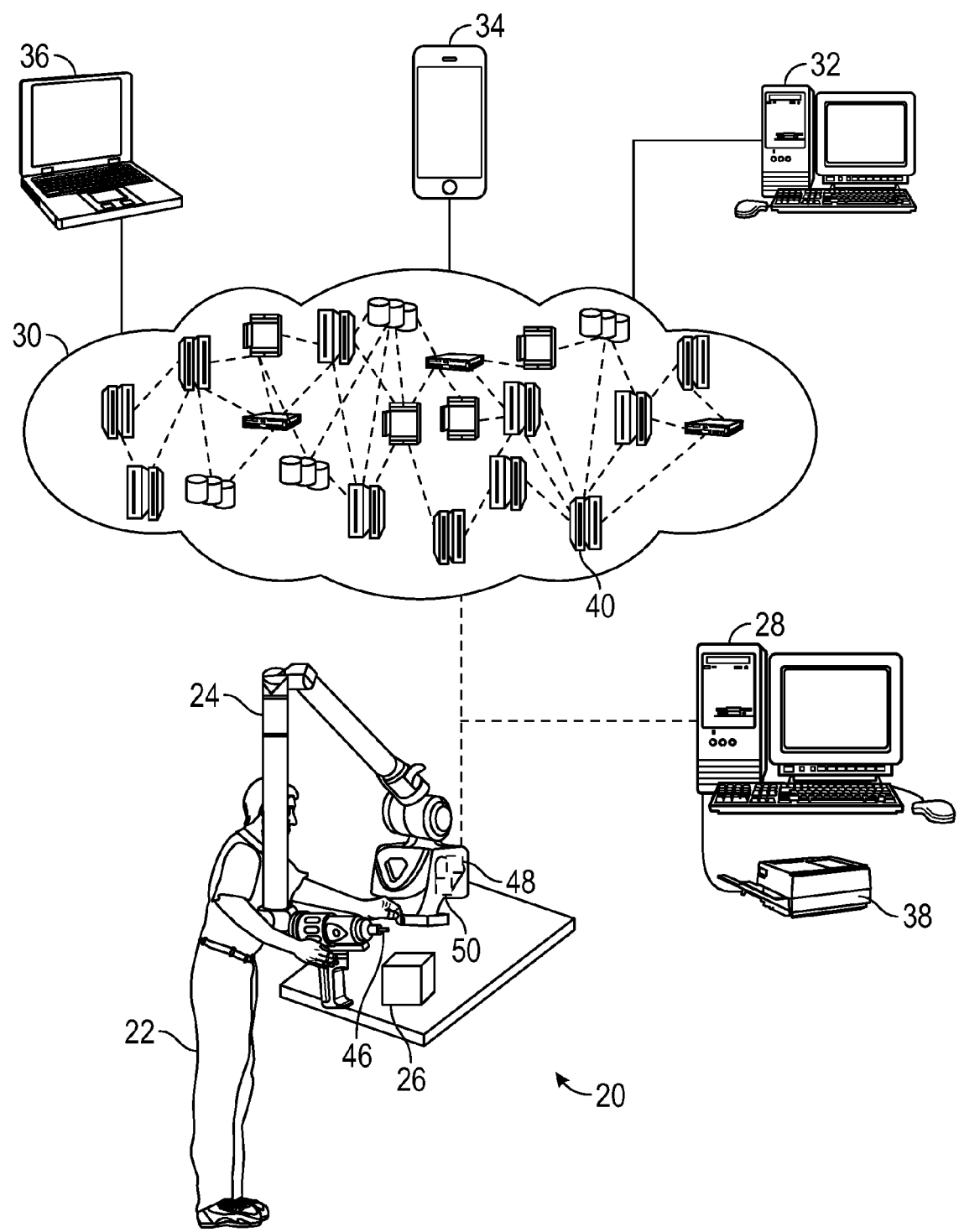
FIG. 1 is a schematic illustration of an operator performing an inspection in accordance with an embodiment of the invention.

Referring now to FIG. 1, a system 20 for inspecting an object and displaying an inspection report using augmented reality is shown. In the illustrated embodiment, an operator 22 is using a three-dimensional (3D) measurement device 24, such as a portable articulated arm coordinate measurement machine (AACMM) for example, to measure the 3D coordinates of points on a workpiece or object 26. The AACMM may be similar to that described in commonly owned U.S. Pat. No. 8,533,967 entitled Coordinate Measurement Machine With Removable Accessories, the contents of which is incorporated herein by reference. It should be appreciated that while embodiments herein with respect to the illustrated embodiment describe the 3D measurement device 24 as an AACCM, this is for exemplary purposes and the claimed invention should not be so limited. In other embodiments, the 3D measurement device may be a laser tracker, a triangulation scanner, a structured light scanner, a theodolite, a total station, a photogrammetry system, a time-of-flight scanner or a combination of the foregoing.

The 3D measurement device 24 is configured to measure the coordinates of points on the object 26 in response to an action by the operator, such as pressing an actuator for example. In one embodiment, the 3D measurement device 24 is configured to measure characteristics of the object 26 in accordance with a predetermined inspection plan. The characteristics may include any typical physical characteristic of the object 26, such as but not limited to the height, length, and width of features of the object, the flatness or curvature of features on the object or the diameter or depth of holes, slots or recesses for example. The 3D measurement device 24 includes an electronic circuit having a processor 50 and memory 48 to allow the 3D measurement device 24 to record and store in memory 48 the 3D coordinates of the object 26. In one embodiment, the 3D measurement device 24 may compare the 3D coordinates of the object 26 to specifications of the object 26 to determine if the features are within acceptable tolerances. In one embodiment, the 3D measurement device 24 may provide an indication to the operator 22 that a particular feature or dimension of the object 26 is outside of the acceptable specification.

In one embodiment, the 3D measurement device 24 is coupled to communicate with a local computing device 28, such as a computer for example. The 3D measurement device and local computing device 28 may also be directly connected to a local area network (LAN) or wide area network (WAN) 30. As will be discussed in more detail herein, the network 30 allows for the 3D coordinate data acquired by the 3D measurement device 24 to be stored on a server 40 on the network 30. The server 40 stores the data and makes it accessible to a variety of devices, such as but not limited to desktop computers 32, cellular phones 34, laptop computers 36, tablet computers or other types of mobile computing devices. The communication medium that connects 3D measurement device 24 with the local computing device 28 or the network 30 may be wired (e.g. Ethernet), wireless (e.g. WiFi or Bluetooth) or a combination of the foregoing. In one embodiment, the local computing device 28 may be a tablet computer or a cellular phone. In one embodiment, coupled to the local computing device 28 is a printer 38. The printer 38 may also be directly coupled to the 3D measurement device 24. As will be discussed in more detail herein, the printer 38 is a device capable of printing a machine readable code or marker, such as a QR code or a bar code for example. Such a machine readable symbol or marker may also be referred to as an AR marker.

Referring now to FIGS. 2-5 with continuing reference to FIG. 1, a method 100 of measuring the object 26 and generating an inspection report that may be viewed using an augmented reality display is performed. In method 100, the operator 22 first inspects the object 26 in block 102. The inspection is performed with the 3D measurement device 24 by acquiring the 3D coordinates of points on the object 26. From the 3D coordinates, the 3D measurement device 24 can determine dimensional characteristics for the object 26, such as the length 42 or height of a feature or the diameter 44 of a hole for example. In an embodiment where the 3D measurement device is an AACMM 24, the measurements may be made by the operator manually moving the arm segments and touching a probe 46 to the object 26. The inspection steps may be part of a predetermined inspection plan. In one embodiment, the predetermined inspection plan is stored in memory 48 on the 3D measurement device 24. In another embodiment, the inspection plan is a paper document followed by the operator 22. In one embodiment, the measurements are made at the discretion of the operator 22 and stored in the 3D measurement device 24 memory 48. The 3D measurement device 24 may include an electronic circuit 50 that determines 3D coordinate data from measurements made by the 3D measurement device and stores the 3D coordinates in memory 48. For AACMM 24, the 3D coordinate data may be determined from encoder signals located at each of the joints of the arm segments that allow the processor 50 to determine the location of the probe 46 in a local coordinate system when the probe 46 contacts the object 26. In other embodiments, the 3D coordinate data may be determined by projecting light (e.g. a laser light, a line of laser light or a structured light pattern) and the acquisition of images of the projected light on the surface of the object.

Figure 6:
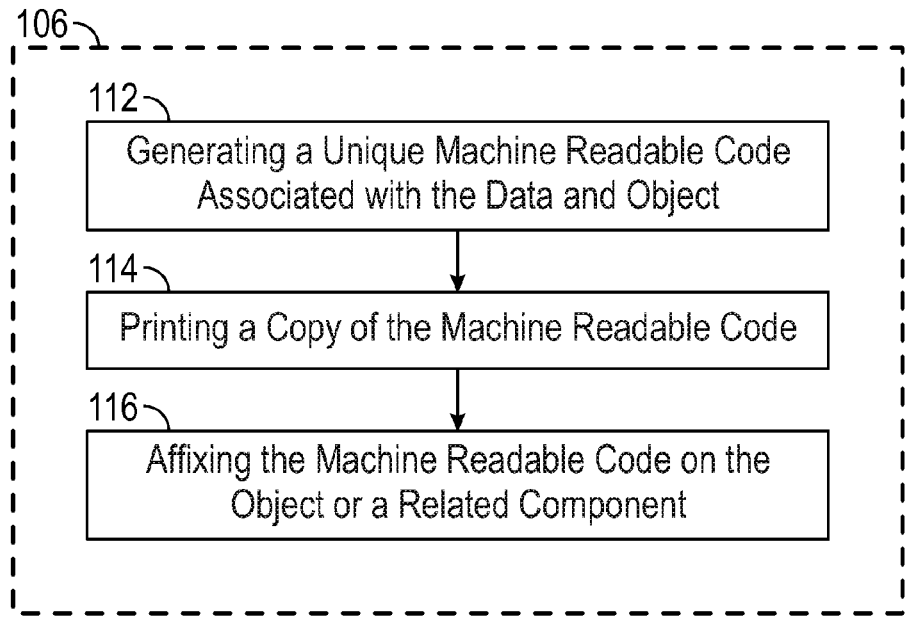

Once the measurements are performed according to the inspection plan, the 3D coordinate data are transmitted to a remote server in block 104, such as server 40 for example. It should be appreciated that the 3D coordinate data may be transmitted to the server as it is acquired. The server 40 receives the 3D coordinate data and stores the data in memory or on a data storage device. In one embodiment, the 3D coordinate data may be stored in a database to facilitate searching and retrieval. Once the 3D coordinate data has been received and stored, the server 40 executes instructions for generating a machine readable symbol or augmented reality (AR) marker in block 106. A machine readable symbol may be a bar code, a QR code or other type of now known or hereinafter developed code, such as but not limited to two-dimensional (2D) Aztec code (ISO/IEC 24778.2008 standard) for example. In one embodiment shown in FIG. 6, the machine readable symbol may be generated in block 112 and transmitted to a printer device, such as printer 38 for example, that is arranged local to the object 26 in block 114. The printer 38 prints the machine readable symbol 52 on media having an adhesive surface that allows the printed machine readable symbol 52 to be fixed in block 116 to either the object (FIG. 2) or an associated article, such as the drawings 54 or assembly documents for example. It should be appreciated that other machine readable systems may also be used and the term AR marker also includes passive and active data storage devices such as but not limited to radio-frequency identification (RFID) and near-field communication (NFC) circuits or tags for example.

The method 100 then proceeds to block 108 where the 3D coordinates may be selectively transmitted from the server 40 to another computing device, such as by a portable computing device 56. The portable computing device 56 may be, but is not limited to a tablet computer, a cellular phone, a laptop computer, a personal digital assistant, an e-reader device or the like for example. The computing device includes one or more processors and memory for executing computer readable instructions. In one embodiment, the 3D coordinates may be recalled by a stationary computing device, such as a desktop computer for example, such as through a computer network for example. The computing device 56 may include a digital camera 58 having a field of view that is configured to acquire a digital image of the area adjacent the computing device 56 and display the image on a screen or video display 60. The camera 58 may be configured to acquire still images or video images.

Figure 3:
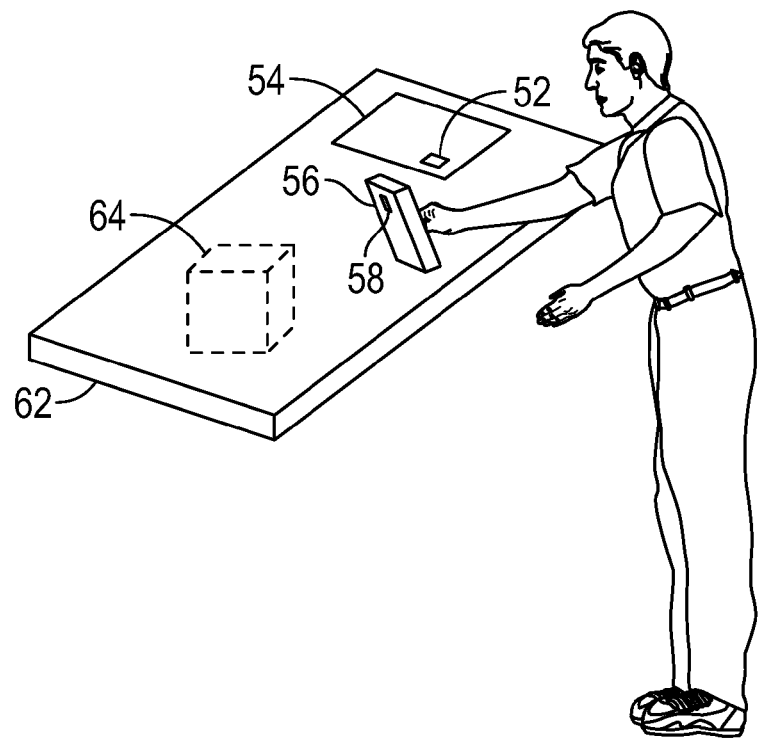
FIG. 3 is an illustration of an operator viewing an inspection report of an object using augmented reality in accordance with another embodiment of the invention.
Figure 4:
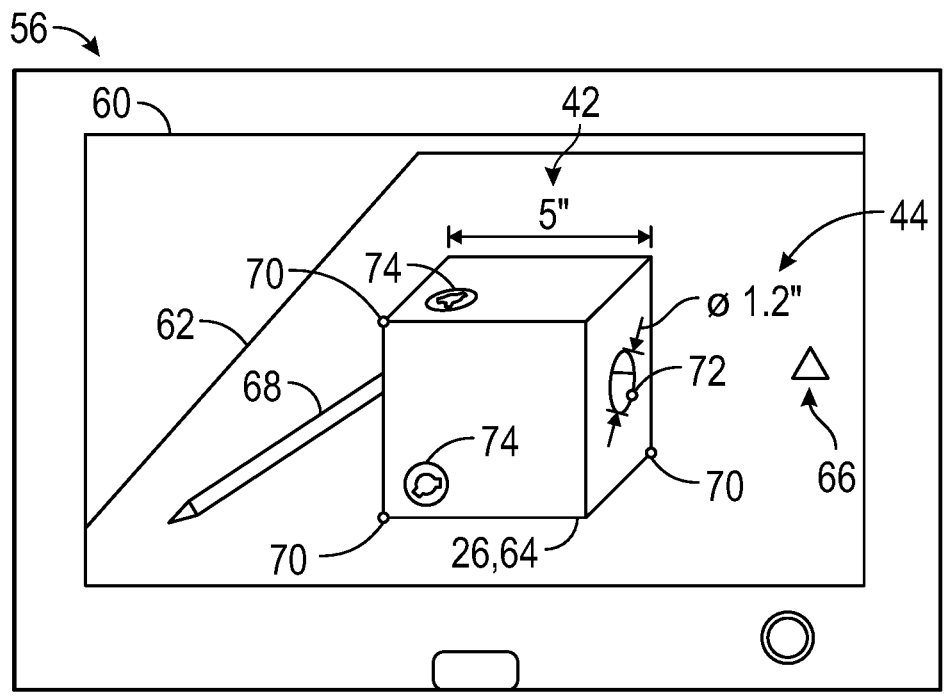
FIG. 4 is an illustration of a portable computing device displaying an inspected object with an inspection report superimposed on the object.
Figure 5:
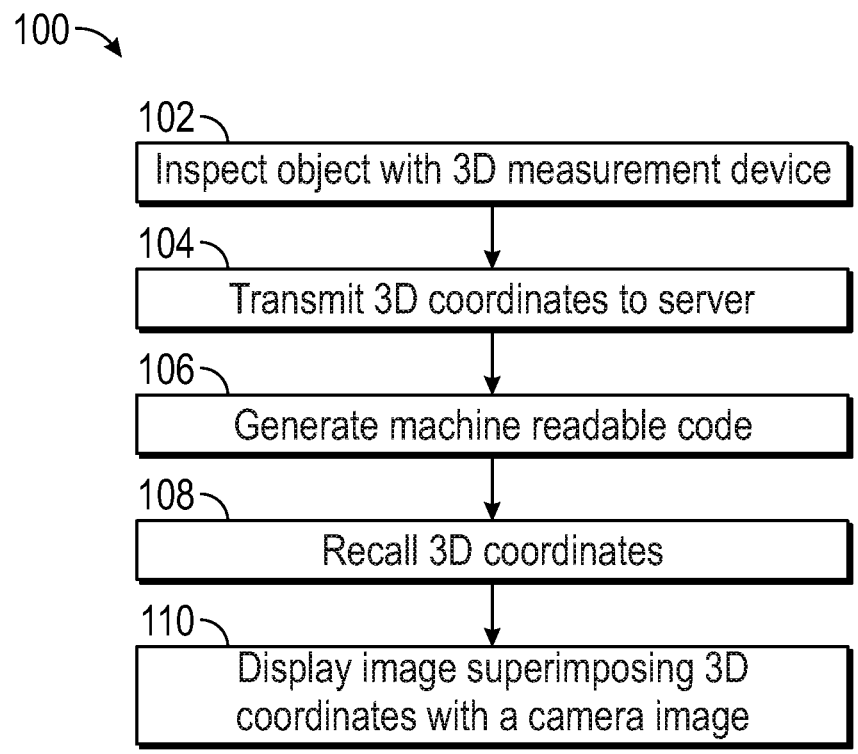
FIG. 5-7 are flow diagrams of methods of acquiring and reviewing inspection reports using augmented reality in accordance with embodiments of the invention.

In one embodiment, the 3D coordinate data is transmitted from the server 40 to the computing device 56 in response to the computing device 56 acquiring an image of the machine readable symbol 52. With the 3D coordinate data transferred to the computing device 56, the method 100 proceeds to block 110 where the 3D coordinate data is superimposed on a real-time or substantially real-time video image to generate an augmented reality image on the display 60 (FIGS. 3-4). As used herein, an augmented reality image is a combination of a camera image of an area, such as the work surface 62 for example, with a computer generated image. As used herein, the computer generated image may be referred to as a virtual object 64. The virtual object 64 is displayed in a manner that makes it appear as if the virtual object 64 is actually present on the work surface 62. For example other objects, such as a pencil 68, may be shown on the display and partially or totally obscured by the virtual object 64. In one embodiment, the virtual object may be located in the camera image at the location of the machine readable symbol 52 or another augmented reality marker. The displaying of the virtual object 64 may be dynamic, such that as the operator moves the computing device 65 around or about the work surface 62, different areas of the virtual object 64 may be displayed.

The computing device 56 is further configured to display inspection data, such as dimensions 42, 44 for example, on the display 60. The displaying of the dimensions may be user selectable or may be automated (e.g. steps through the inspection plan). One or more symbols 66 or textual information may be displayed alongside the virtual object. These symbols 66 may be used to convey information about the results of the inspection, such as a warning that a feature has a dimension that deviates from or is outside of the desired specification or tolerance for example. In one embodiment, deviations from the specification are determined by comparing a collection of 3D coordinate data to a dimensional representation of the object, such as a computer-aided-design (CAD) model for example.

It should be appreciated that the viewing of the virtual object 64 using augmented reality may be performed anywhere that the computing device 56 may receive the 3D coordinate data. This provides advantages in allowing personnel to review inspection results for an object even if the objected is remotely located.

Figure 2:
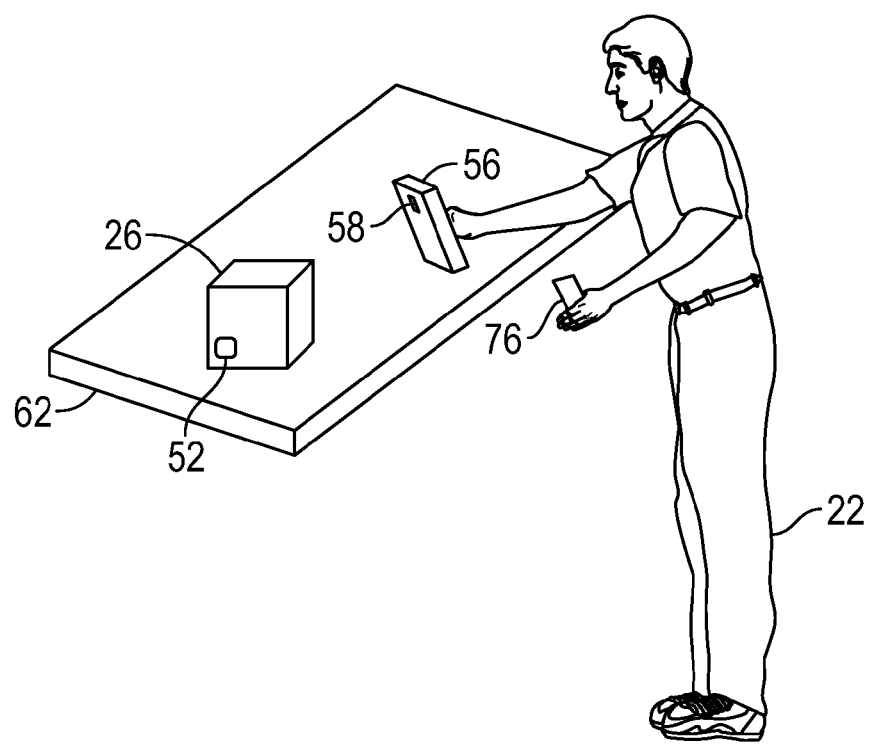
FIG. 2 is an illustration of an operator viewing an inspection report of an object using augmented reality in accordance with an embodiment of the invention.
Figure 7:
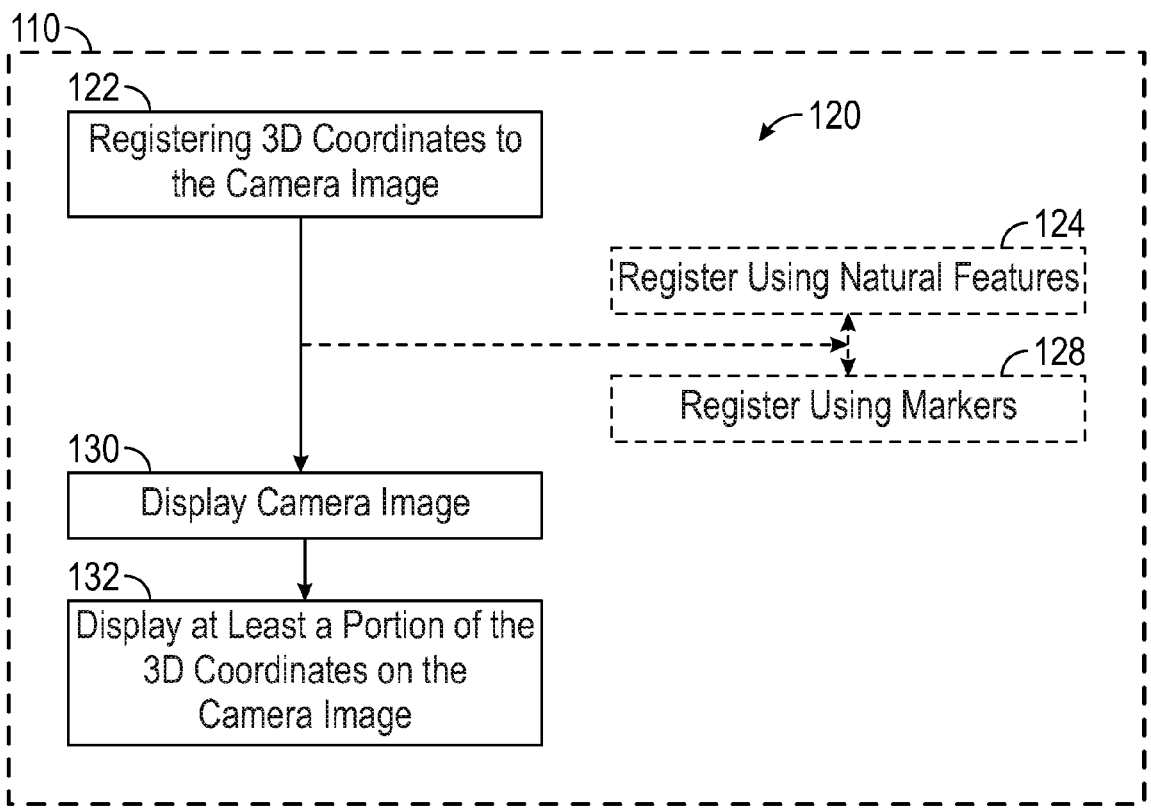

In another embodiment shown in FIGS. 2 and 4, the computing device 56 may superimpose in real-time or substantially real-time the 3D coordinate data on the object 26 in response to the machine readable symbol being acquired by the camera 58 and the object 64 being within (or being brought within) the field of view of the camera 58. With reference now to FIG. 7 and with continuing reference to FIGS. 1, 2, 4 and 5, the process 120 of block 110 (FIG. 5) is shown for an embodiment where the 3D coordinate data is displayed on an image of the real or actual object 26. The process 120 includes the step of registering the 3D coordinate data to the object 26 in the camera image in block 122. As used herein, the term "registering" means the transforming the 3D coordinate data into a local coordinate system so that the 3D coordinate data overlays or is superimposed on the same location within the camera image as the object 26.

The registration of the 3D coordinate data may be performed in several ways. In one embodiment, the process 120 proceeds to block 124 where the 3D coordinate data is registered to the object 26 using the natural features of the object 26. These natural features may include corners 70 (FIG. 4) or edges 72 of features for example. The natural features may also include an entire feature, such as the edge of a hole for example. The natural features 70, 72 used in registration may be indicated on the display 60, such as in the form of a symbol or small circle for example.

Instead of using natural features 70, 72, the process 120 may instead proceed to block 128 where registration is performed using markers 74, such as photogrammetry markers for example, located on the object 26. The use of markers 74 may provide advantages where the 3D measurement device is a measurement device such as a triangulation scanner or a laser line probe where images of the object 26, including the markers 74, are acquired while the inspection plan is being performed.

The registration process under either the natural feature registration or the registration marker process results in the generation of a registered collection of 3D coordinate data. This registered collection of 3D coordinate data is the 3D coordinate data transformed into the local coordinate system of the camera image. After the registration steps, the process 120 then proceeds to block 130 where the camera image is displayed on the display 60. Then at least a portion of the 3D coordinate data or inspection data is superimposed or overlaid on the camera image, such as the dimensions 42, 44 or warning symbol 66.

Figure 8:
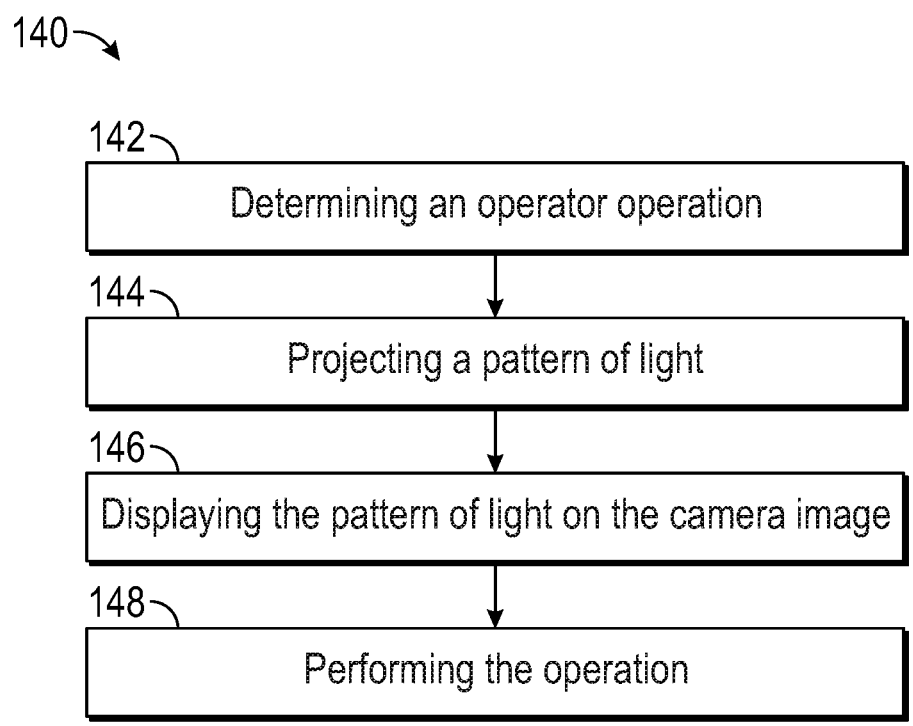
FIG. 8 is a flow diagram of a method of guiding an operator in an operation using augmented reality in accordance with an embodiment of the invention.

Embodiments described above refer to a relatively review of the inspection plan, however, the augmented reality display of 3D coordinates may also be used to guide the performance of operations on the object 26. Referring now to FIG. 8, an embodiment of a method 140 is shown for performing an operation on an object. The method 140 starts in block 142 where an operation for the operator to perform is determined. The operation may be in response to the 3D coordinate data acquired as part of the inspection plan for example. If the 3D coordinate data indicates that a feature is outside of the desired specification or tolerance, then the determined operation may allow the feature to be brought within specification, such as by reaming an undersized hole for example. It should be appreciated that the determined operation does not have to be related to a feature that is out of specification. The determined operation may include, but is not limited to: drilling, milling, turning, filing, deburring, welding, soldering, gluing, riveting, screwing, nailing, painting, cutting, and affixing labels for example.

The method 140 then proceeds to block 144 where the computing device projects a pattern of light onto the object 26 in the location where the operation is to be performed. The location may be a feature (e.g. a hole) or a position on a surface (e.g. affix a label) for example. The pattern of light may be generated by the light source used for the camera 58 for example. In this embodiment, the pattern of light may be projected only when the computing device 56 is oriented and positioned to allow the pattern to fall on the desired location. The method 140 then proceeds to block 146 where the pattern of light or a computer generated image of the pattern of light is displayed on the display 60. It should be appreciated that the projecting of the pattern of light and the displaying of the pattern may provide advantages in allowing two different operators to cooperate in performing the operation since the operator holding the computing device 56 will not have to look away from the computing device 56 to see where the pattern is projected. The method 140 then proceeds to block 148 where the operation is performed by the operator. The method 140 may optionally loop back to block 144 to sequentially project a pattern of light onto a plurality of locations. In one embodiment, the computing device 56 is sized and shaped to allow the operator 22 to hold a tool 76 (FIG. 2) for performing the operation.

It should be appreciated that while embodiments herein describe the 3D coordinate data as being transmitted to a remote server, this is for exemplary purposes and the claimed invention should not be so limited. In other embodiments, the data may be stored on a computing device adjacent or nearby the 3D measurement device. This local computing device may then be accessed by other devices via the network. In another embodiment, the data is stored on the 3D measurement device and the 3D measurement device functions as a server for the distribution of the data to remotely located computing devices that use the data to review the inspection report using an augmented reality display.

Technical effects and benefits include the transforming of 3D coordinate data and inspection plan result data into a visual representation on a display that allows a user to view the inspected object as if it was located in the area adjacent the user. Further technical effects and benefits include the guiding of a user in the performance of an operation by the projection of a light from a portable computing device onto the object based at least in part on the 3D coordinate data.

In accordance with one embodiment of the invention a method of comparing measured three-dimensional (3D) measurement data to an object is provided. The method includes the steps of providing a 3D measurement device configured to measure 3D coordinates of points on the object; providing a computing device having an integrated camera and an integrated display; providing an AR-marker reader; providing a computer network; and providing a dimensional representation of the object and storing the dimensional representation of the object on the computer network. During an inspection process, the method performs steps of: measuring the object with the 3D measurement device, the 3D measurement device providing a first collection of 3D coordinates; storing the first collection of 3D coordinates on the computer network; associating an AR marker with the object. During an observation process occurring at a time later than the inspection process, the method performs the steps of: reading the AR marker with the AR-marker reader; transmitting from the computer network the first collection of 3D coordinates and the dimensional representation of the object; determining an object identification based at least in part on the AR marker; positioning the integrated camera to view the object and to generate a camera image of the viewed object; displaying the camera image on the integrated display; registering a portion of the first collection of 3D coordinates to the camera image to obtain a registered collection of 3D coordinates, the registration based at least in part on comparison of the camera image and one of the first collection of 3D coordinates and the dimensional representation of the object on the computer network; and showing on the integrated display the registered collection of 3D coordinates and the camera image.

In accordance with an embodiment, the method may further comprise the steps of: during the inspection process, determining deviations of the first collection of 3D coordinates relative to the dimensional representation of the object; and during the observation process, showing on the integrated display the deviations of the first collection of 3D coordinates. The method may further comprise a step wherein the step of registering a portion of the first collection of 3D coordinates to the camera image to obtain a registered collection of 3D coordinates further comprises comparing natural features of the object recognized on the camera image to the dimensional representation of the object.

In accordance with an embodiment, the method may perform a step wherein the step of registering a portion of the first collection of 3D coordinates to the camera image to obtain a registered collection of 3D coordinates further comprises comparing a plurality of registration markers on the object as seen in the camera image to a plurality of registration markers as observed in the first collection of 3D coordinates.

In accordance with an embodiment, the method may perform steps comprising: providing the computing device with a projector; and during the observation process, projecting with the projector a first pattern of light. The step of projecting with the projector a first pattern of light, the projected light is a symbol that indicates a machining or assembly operation to be performed by an operator. The step of projecting with the projector a first pattern of light may further include a symbol that represents the machining or assembly operation that is selected from the group consisting of drilling, milling, turning, filing, deburring, welding, soldering, gluing, riveting, screwing, nailing, painting, cutting, and affixing labels.

In accordance with an embodiment, the step of projecting with the projector a first pattern of light, the first pattern of light is displayed to draw an observer's attention to a location on the object. The step of projecting with the projector a first pattern of light, the first pattern of light is projected sequentially to a plurality of locations on the object.

In accordance with an embodiment in the step of showing on the integrated display the registered collection of 3D coordinates and the camera image, the 3D coordinates are obtained for an object used in the manufacture of goods; and the method may further include a step of showing on the integrated display production metric associated with the object, the production metric selected from a group consisting of quantity of goods produced, record of maintenance performed, and record of next calibration due date.

In accordance with an embodiment the 3D measurement device may be selected from the group consisting of a triangulation scanner, a time-of-flight scanner, a laser tracker, an articulated arm coordinate measuring machine (CMM), and a Cartesian CMM.

In accordance with an embodiment the AR marker may be selected from the group consisting of a barcode marker, a QR-code marker, a radio-frequency-identification (RFID) tag, and a near-field communication (NFC) tag.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of comparing measured three-dimensional (3D) measurement data to an object comprising:
    providing a 3D measurement device configured to measure 3D coordinates of points on the object;
    providing a computing device having an integrated camera and an integrated display;
    providing an AR-marker reader operably coupled to the computing device;
    providing a computer network operably coupled to the 3D measurement device, the AR-marker reader and the computing device;
    providing a dimensional representation of the object and storing the dimensional representation of the object on the computer network;
    during an inspection process, performing steps of:
        measuring the object with the 3D measurement device, the 3D measurement device providing a first collection of 3D coordinates;
        storing the first collection of 3D coordinates on the computer network;
        associating an AR marker with the object;
    during an observation process occurring at a time later than the inspection process, performing steps of:
        reading the AR marker with the AR-marker reader and, in response, selecting from the computer network the first collection of 3D coordinates and the dimensional representation of the object;
        transmitting from the computer network the first collection of 3D coordinates and the dimensional representation of the object;
        positioning the integrated camera to view the object and to generate a camera image of the object;
        displaying the camera image on the integrated display;
        registering a portion of the first collection of 3D coordinates to the camera image to obtain a registered collection of 3D coordinates, the registration based at least in part on comparison of the camera image and one of the first collection of 3D coordinates and the dimensional representation of the object on the computer network; and
        showing on the integrated display the registered collection of 3D coordinates and the camera image.

2. The method of claim 1 further comprising:
    during the inspection process, determining deviations of the first collection of 3D coordinates relative to the dimensional representation of the object; and
    during the observation process, showing on the integrated display the deviations of the first collection of 3D coordinates.

3. The method of claim 1 wherein the registering the portion of the first collection of 3D coordinates to the camera image further comprises comparing natural features of the object recognized on the camera image to the dimensional representation of the object.

4. The method of claim 1 wherein the registering the portion of the first collection of 3D coordinates to the camera image further comprises comparing a plurality of registration markers on the object as seen in the camera image to a plurality of registration markers as observed in the first collection of 3D coordinates.

5. The method of claim 1 further comprising steps of:
    providing the computing device with a projector; and
    during the observation process, projecting with the projector a first pattern of light.

6. The method of claim 5 wherein, in projecting with the projector the first pattern of light, the first pattern of light is projected onto a predetermined location on the object.

7. The method of claim 6 wherein, in the projecting with the projector a first pattern of light, the first pattern of light is projected sequentially to a plurality of predetermined locations on the object.

8. The method of claim 1 further comprising showing on the integrated display a production metric associated with the object, the production metric selected from a group consisting of quantity of goods produced, record of maintenance performed, and record of next calibration due date.

9. The method of claim 1, wherein the 3D measurement device is selected from the group consisting of a triangulation scanner, a time-of-flight scanner, a laser tracker, an articulated arm coordinate measuring machine (CMM), and a Cartesian CMM.

10. The method of claim 1, wherein the AR marker is selected from the group consisting of a barcode marker, a QR-code marker, a radio-frequency-identification (RFID) tag, and a near-field communication (NFC) tag.

11. The method of claim 5 wherein, in the projecting with the projector the first pattern of light, the first pattern of light includes a symbol that indicates a machining or assembly operation to be performed by an operator.

12. The method of claim 11 wherein, in the symbol indicates the machining or assembly operation selected from the group consisting of drilling, milling, turning, filing, deburring, welding, soldering, gluing, riveting, screwing, nailing, painting, cutting, and affixing labels.

13. A system comprising:
    a 3D measurement device configured to measure 3D coordinates of points on an object;
    an AR-marker reader operably coupled to the 3D measurement device;
    a computer network; having a dimensional representation of the object and a first collection of 3D coordinates stored thereon, the first collection of coordinated acquired by the 3D measurement device, the computer network being operably coupled to the 3D measurement device and the AR-marker reader;
    a computing device having an integrated camera and an integrated display, the computing device being operably coupled to the AR-marker reader and the computer network, the computing device further having a memory having computer readable instructions and one or more processors for executing the computer readable instructions, the computer readable instructions comprising:

reading an AR marker with the AR-marker reader and, in response, selecting from the computer network the first collection of 3D coordinates and the dimensional representation of the object;

transmitting from the computer network the first collection of 3D coordinates and the dimensional representation of the object;

generating a camera image of the object;

displaying the camera image on the integrated display;

registering a portion of the first collection of 3D coordinates to the camera image to obtain a registered collection of 3D coordinates, the registration based at least in part on comparison of the camera image and one of the first collection of 3D coordinates and the dimensional representation of the object; and showing on the integrated display the registered collection of 3D.

14. The system of claim 13, wherein the computer readable instructions further comprise:

determining deviations of the first collection of 3D coordinates relative to the dimensional representation of the object; and showing on the integrated display deviations of the first collection of 3D coordinates.

15. The system of claim 13, wherein the registering the portion of the first collection of 3D coordinates to the camera image further comprises comparing natural features of the object recognized on the camera image to the dimensional representation of the object.

16. The system of claim 13, wherein the step of registering the portion of the first collection of 3D coordinates to the camera image further comprises comparing a plurality of registration markers on the object as seen in the camera image to a plurality of registration markers as observed in the first collection of 3D coordinates.

17. The system of claim 13, wherein the computer readable instructions further comprise projecting with a projector a first pattern of light.

18. The system of claim 17 wherein, in the projecting with the projector the first pattern of light, the first pattern of light includes a symbol to indicate a machining or assembly operation to be performed by an operator.

19. The system of claim 18 wherein, in projecting of the symbol, the symbol indicates the machining or assembly operation selected from the group consisting of drilling, milling, turning, filing, deburring, welding, soldering, gluing, riveting, screwing, nailing, painting, cutting, and affixing labels.

20. The system of claim 13 wherein the computer readable instructions further comprise a showing on the integrated display a production metric associated with the object, the production metric selected from a group consisting of quantity of goods produced, record of maintenance performed, and record of next calibration due date.

* * * * *